T. L. TALIAFERRO & J. B. BELLAMY.
SHEET METAL COVER FOR RECEPTACLES.
APPLICATION FILED AUG. 29, 1913.

1,103,633.

Patented July 14, 1914.

UNITED STATES PATENT OFFICE.

THOMAS LUCIEN TALIAFERRO AND JOHN BENTON BELLAMY, OF WHEELING, WEST VIRGINIA, ASSIGNORS, BY MESNE ASSIGNMENTS, TO PHOENIX-HERMETIC COMPANY, OF NEW YORK, N. Y., A CORPORATION OF NEW YORK.

SHEET-METAL COVER FOR RECEPTACLES.

1,103,633.

Specification of Letters Patent. Patented July 14, 1914.

Application filed August 29, 1913. Serial No. 787,339.

*To all whom it may concern:*

Be it known that we, THOMAS LUCIEN TALIAFERRO and JOHN BENTON BELLAMY, citizens of the United States, residing at Wheeling, in the county of Ohio, State of West Virginia, have invented certain new and useful Improvements in Sheet-Metal Covers for Receptacles, of which the following is a description, reference being had to the accompanying drawing and to the figures of reference marked thereon.

The invention relates to new and useful improvements in closures for receptacles and more particularly to a sheet metal closure for a receptacle of glass, porcelain, and the like.

An object of the invention is to provide a cover or closure for a receptacle of the above character, which is so shaped that the same may be attached to the receptacle and firmly retained thereon by pressure applied to the outer extreme edge of the cover or closure, and which cover or closure is so shaped as to support a rubber gasket or sealing ring which is forced into contact with the side wall of the receptacle upon the bending of the edge of the cover to close the receptacle.

Figure 1:
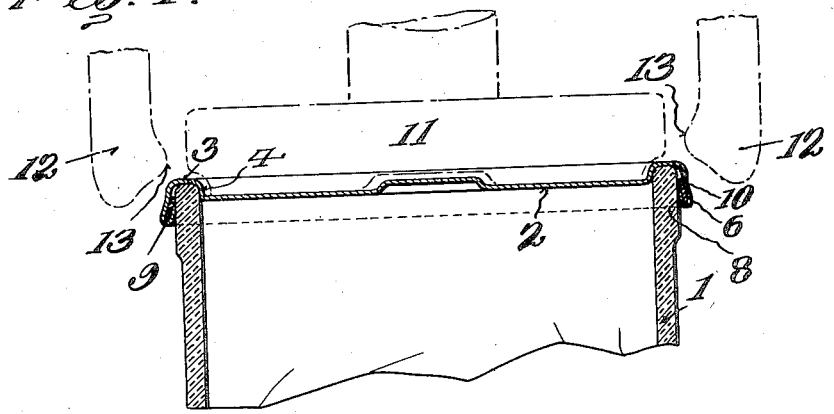
Figure 2:
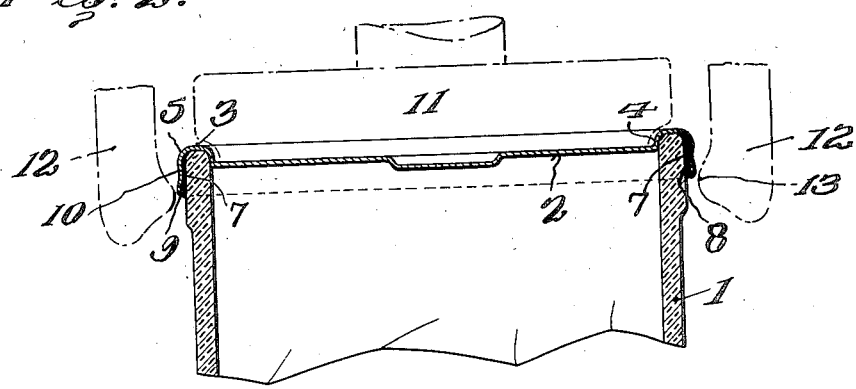
Figure 3:
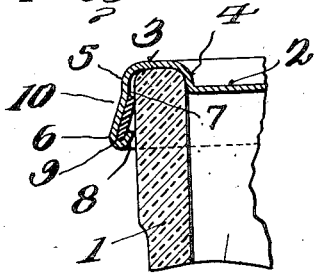
Figure 4:
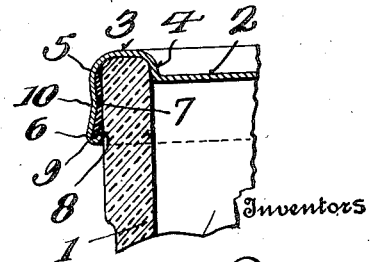

In the drawings, which show by way of illustration one embodiment of the invention, Figure 1 is a sectional view showing the improved cover applied to a receptacle and before the cover is bent to close the same on to the receptacle. Fig. 2 is a similar view showing the cover bent into gripping contact with the side wall of the receptacle. Fig. 3 is an enlarged detail view in section showing the cover when first applied to the receptacle and before the outer wall of the channel is bent into contact with the receptacle. Fig. 4 is a similar view showing the outer wall of the channel bent inward toward the receptacle and the sealing ring or gasket forced into sealing contact with both the cover and the body of the receptacle.

In carrying out the invention, a sheet metal cover is provided which comprises a circular portion having a periphery preferably bent to form a U-shaped annular channel which is adapted to engage the upper edge of the receptacle to be closed. The outer wall of the channel is formed with a substantially vertical portion at the upper part thereof and the lower edge of the wall is curved outwardly so as to form with the vertical wall an annular sealing and gripping shoulder which is adapted to be pressed against the rubber sealing ring or gasket and thereby form a sealing lip which effectively seals the receptacle. This gripping shoulder also aids in holding the cover on the receptacle. The outer wall of the cover is also turned inwardly and upwardly to form a retaining pocket for the rubber gasket or ring which serves to support said rubber gasket or ring in proper position relative to the sealing or gripping shoulder of the cover and which also serves the additional function of forcing said sealing ring or gasket upwardly between the cover and the receptacle when the lower edge of the outer wall is bent inwardly to close the cover on to the receptacle. This gasket or ring may be made of rubber, as above noted, or may be of any suitable composition of matter capable of sealing the cover when the same is closed on the receptacle.

Referring more in detail to the drawings, the invention consists in the receptacle 1 which is preferably circular in cross section and the side walls at the upper edge thereof lie substantially in vertical planes. This receptacle is preferably made of glass, porcelain, and the like, as above noted, and is adapted to be closed by our improved cover 2. This cover is made of metal and consists of a central circular portion which has its periphery bent to form a U-shaped channel 3 which is adapted to engage the upper edge of the side walls of the receptacle 1. The inner wall 4 of the U-shaped channel is preferably substantially vertical. The upper portion 5 of the outer wall of the channel is also substantially vertical and the lower edge 6 of this outer wall is curved outwardly so as to form with the vertical wall 5 an annular sealing or gripping shoulder 7, the purpose of which will be hereinafter more fully described. The lower edge 6 of this outer wall is bent inwardly and upwardly, as at 8, so as to form a retaining pocket 9 which is adapted to receive a rubber ring or gasket 10. This rubber ring or gasket 10 extends upwardly along the inside of the wall 5 to a point adjacent the sealing or gripping shoulder 7.

The lower part of the outer wall of the U shaped channel is bent outwardly, as above noted, and therefore, forms an open mouth which is adapted to receive the side wall of the receptacle. It is found in practice that receptacles of the character described are often slightly irregular in contour or form with imperfections in the surface of the glass or porcelain and, therefore, a cover that is shaped so as to fit closely on the outer wall of the receptacle when placed thereon cannot readily be seated on the receptacle. Our improved cover, however, with this wide receiving mouth for the channel may be readily applied, notwithstanding the slight irregularities in the construction of the receptacle.

In Fig. 1 of the drawings, we have shown the cover seated thereon by a chuck 11. Closing tools 12 indicated diagrammatically in this view, are formed with cam shoulders 13 which, when the tools are moved downward, will engage the outer wall of the cover and force this outer wall toward the receptacle. This forcing or bending of the outer wall toward the receptacle will cause the lower edge of the outer wall to force the sealing ring or gasket slightly upward on the outer wall of the receptacle, thus firmly crowding said rubber ring or gasket between the outer wall of the receptacle and the inner wall of the cover. This forcing inward of the outer wall of the cover also carries the sealing or gripping shoulder inward and causes the same to be embedded in the sealing ring or gasket and also to exert a pressure against the receptacle which tends to hold the cover firmly seated on the receptacle sealing the same.

Our improved cover is especially adapted for the closing of a receptacle which is put under vacuum. While the cover is resting loosely on the receptacle, as in Fig. 1 of the drawings, and perhaps before the chuck has engaged the cover to crowd the same on to the receptacle, said receptacle is placed under a vacuumizer and preferably while the receptacle is in the vacuumizing chamber, the cover is bent into closing and sealing position, as indicated in Figs. 2 and 4.

It is obvious that minor changes in the details of construction may be made without departing from the spirit of the invention as set forth in the appended claims.

Having thus described our invention, what we claim is:

1. A receptacle having an outer vertical wall at its upper edge and a sheet metal cover therefor comprising a circular portion having the periphery thereof bent to form a downwardly projecting wall, the lower portion of said wall of the cover being bent outwardly relative to the upper portion of said wall and having an inwardly and upwardly projecting portion and a sealing gasket seated in the pocket formed by said upwardly projecting portion and extending upwardly therefrom whereby the bending of the lower portion of the cover inwardly toward the receptacle will force said sealing gasket upwardly along said vertical wall of the receptacle in firm sealing contact therewith.

2. A receptacle having an outer vertical wall at its upper edge and a sheet metal cover therefor comprising a circular portion having its periphery bent to form a downwardly projecting wall engaging the vertical wall of the receptacle, the lower portion of said wall of the cover being bent outwardly relative to the upper portion of said wall and forming with said upper portion an inwardly projecting shoulder, the lower edge of said wall having an inwardly and upwardly projecting portion and a sealing gasket seated in the pocket formed by said upwardly projecting portion and extending upwardly along the inner face of said wall to a line adjacent said shoulder, whereby the inward bending of the lower portion of said wall forces said sealing gasket upwardly along the face of said outer vertical wall of the receptacle and also forces said gripping shoulder into sealing contact with said rubber gasket.

3. A receptacle having an outer vertical wall at its upper edge and a sheet metal cover therefor comprising a circular portion having the periphery thereof bent to form a downwardly projecting wall, the lower portion of said wall of the cover being bent outwardly relative to the upper portion of said wall whereby when said cover is closed on the receptacle an inwardly projecting shoulder is formed, a sealing gasket, means for securing and supporting said sealing gasket on the inner face of the outwardly projecting portion of said downwardly projecting wall, said sealing gasket terminating upwardly adjacent said shoulder whereby when said lower portion of said outer vertical wall is bent inwardly to secure said cover to the receptacle said gasket will be forced upwardly along the wall of the receptacle and into firm sealing contact therewith at the region of said inwardly projecting shoulder.

In testimony whereof, we affix our signatures, in the presence of two witnesses.

THOMAS LUCIEN TALIAFERRO.
JOHN BENTON BELLAMY.

Witnesses:
A. L. METZNER,
J. N. DEAKIN.